United States Patent [19]

Mizoguchi

[11] Patent Number: 4,637,285
[45] Date of Patent: Jan. 20, 1987

[54] AUTOMATIC FEED DEVICE FOR A FACING HEAD

[76] Inventor: Hideo Mizoguchi, 1249-1, Ohaza Ueki, Nogata-shi, Fukuoka-ken, Japan

[21] Appl. No.: 759,637

[22] Filed: Jul. 26, 1985

[30] Foreign Application Priority Data

Aug. 6, 1984 [JP] Japan .................... 59-165343

[51] Int. Cl.$^4$ .......................... B23B 29/034
[52] U.S. Cl. ....................... 82/2 E; 82/1.2; 408/181
[58] Field of Search ............. 82/1.2, 1.3, 1.4, 2 E; 408/152, 153, 162, 181, 182, 183, 184, 185

[56] References Cited

U.S. PATENT DOCUMENTS

| | | | |
|---|---|---|---|
| 2,093,743 | 9/1937 | Steiner | 82/2 E |
| 2,151,251 | 3/1939 | Weidner | 82/2 E |
| 2,209,867 | 7/1940 | Wohlhaupter | 82/2 E |
| 3,067,637 | 12/1962 | Horning | 408/181 |
| 3,344,693 | 10/1967 | Scholl | 408/181 |
| 3,352,185 | 11/1967 | Wohlhaupter | 82/2 E |
| 3,744,352 | 7/1973 | Scholl | 82/1.2 |

*Primary Examiner*—Lowell A. Larson
*Assistant Examiner*—Jerry Kearns
*Attorney, Agent, or Firm*—Jordan and Hamburg

[57] ABSTRACT

An automatic feed device for a facing head comprising a shank mounted to the main shaft of a machine tool, a body coaxial with the shank, a tool holder slidably fitted thereto, and an operating ring rotatably fitted between the shank and the body is disclosed. The automatic feed device comprises a worm shaft disposed at the body, clutches and worm wheels, a gear meshing with a stationary gear of the operating ring, a feed gear engageable with feed pins thereof, an internally threaded worm wheel meshing with the worm wheel, a feed screw engageable with the internally threaded worm wheel, a shifter connected to the clutches, a shifter driving shaft engageable therewith, a shift lever constituting a cam, a forked connecting member connected to the shifter driving shaft, a press lever adapted to press a cam roller against the cam, and a feed direction detecting lever connected to the shift lever.

9 Claims, 9 Drawing Figures

AUTOMATIC FEED DEVICE FOR A FACING HEAD

BACKGROUND OF THE INVENTION

1. Field of the Invention

This invention relates to an automatic feed device for use in connection with a numerically controlled machine tool having an automatic tool exchanger, known as a machining center, which is automatically arranged on the main shaft of a machine tool so as to permit automatic facing with the aid of a cutting tool, by means of numerical data recorded and stored on magnetic tapes and the like, thereby requiring no manual operation.

2. Description of the Prior Art

In a prior general-purpose machine tool such as a milling machine and the like, a body is arranged at the lower end portion of a shank mounted to the main shaft of the machine tool. Further, a cutting tool support mechanism is free to slide on the lower end surface of the body through dovetail slots extending in a direction normal to the axis of the main shaft. Upon rotation of the main shaft, the cutting tool support mechanism is moved in a transverse direction, a direction normal to the axis of the main shaft, by automatic feed or return means, to thereby effect facing by the use of a cutting tool. However, such means requires manual operation by the operator.

It should be mentioned that it is inefficient for the operator to stop rotation of the main shaft during automatic operation of a machining center and to manually operate the machine tool, and that automatic operation of the machine tool is thus impossible. It should also be mentioned that the cutting tool support mechanism is moved by rotation of the main shaft. However, since such movement of the cutting tool support mechanism provides an output for stopping feeding of the cutting tool, no output is provided once the cutting tool support mechanism is stopped. It is considered, therefore, that rapid returning and feeding of the cutting tool support mechanism is not automatically effected.

In the course of automatic operation of the machining center, the number of rotation of the main shaft per minutes as well as the time of rotation thereof are determined under a numerical control system. There may thus be errors when the rotation of the main shaft is started or stopped. Also, when the tool is exchanged, the main shaft needs to be rotated so as to stop the cutting tool support mechanism in a fixed position. When rapid returning of the cutting tool support mechanism is complete, the cutting tool support mechanism must be stopped in a fixed position independently of the rotation of the main shaft. Otherwise, a starting position from which the cutting tool is fed becomes unstable by reason of the foregoing. Also the movement of the cutting tool support mechanism provides an output for stopping rapid returning and feeding in the same manner as mentioned above. Thus, no output is provided if such rapid returning and feeding of the cutting tool support mechanism is stopped.

SUMMARY OF THE INVENTION

It is a first object of this invention to provide feed direction changing means which automatically operatively associates a cutting tool support mechanism with another means. Said mechanism being in a non-output condition when cutting operation is changed to rapid returning operation, or such rapid returning operation is stopped.

It is a second object of the invention to provide means for initiating automatic cutting operation by automatically stopping rapid returning operation independently of the main shaft of a machine tool, stopping the main shaft once, rotating the main shaft several times in a counterclockwise direction, and after stopping of such rotation, rotating the safe in a clockwise direction.

It is a third object of the invention to provide means for readily and rapidly changing the speed of automatic cutting operation according to materials to be processed, or roughing and finishing cut. This invention will be best understood from the following description in connection with the accompanying drawings.

DESCRIPTION OF THE PREFERRED EMBODIMENT

Figure 1:
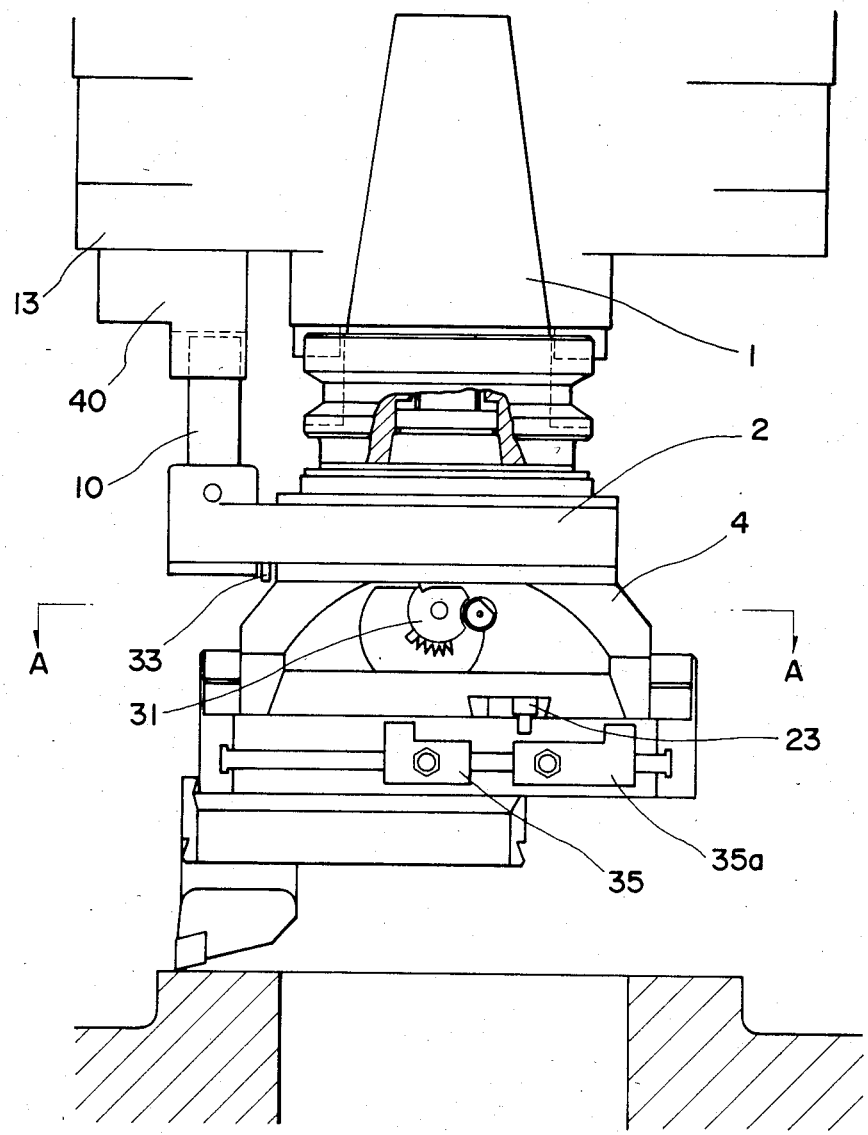
FIG. 1 is a front view of the device according to this invention.
Figure 2:
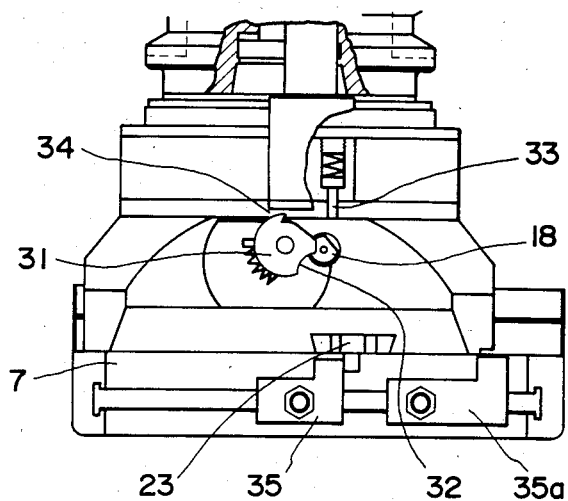
FIG. 2 and FIG. 3 are front views, partly broken away, of the device in motion.
Figure 3:
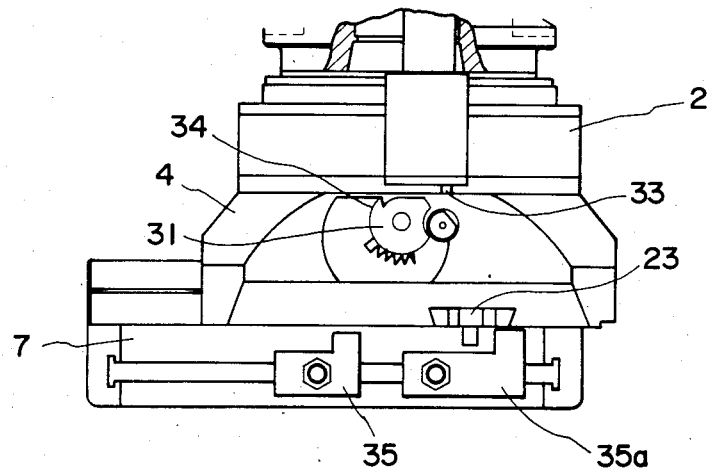

Referring now to the drawings, this device generally includes a shank 1 mounted rotatably to the main shaft of a machine tool, a body 4 fixed coaxially to the shank 1 and having on one end surface a central shaft to which an operating ring 2 is rotatable fitted and on the other end surface dovetail slots 3 each extending in a direction normal to the axis of the main shaft, said body 4 being provided in its interior with a feed direction shift means and in the exterior with a stop means, and a tool holder 7 having dovetails 5 slidably fitted in the corresponding dovetail slots 3 and a feed screw 6 fitted in a hole extending parallel to the dovetails 5, said tool holder 7 being movable while rotating in a radial direction relative to the axis of rotation of the body 4 under the influence of a series of gears operatively associated with the body 4.

The operating ring 2 includes a stationary gear 9 provided at its inner periphery and adapted to mesh with a gear 8 as described below, and a fixed shaft 10 projecting axially from the outer periphery thereof and fixed to a casing 13 for the main shaft. While the body 4 is rotatable with the main shaft, the operating ring 2 is in no case rotatable therewith. The operating ring 2 is, on the other hand, intended to shift the tool holder 7 in cooperation with the gear 8 meshing with the stationary gear 9 and a feed gear 12 meshing with feed pins 11 as described below.

Reference is now made to the feed direction shift means incorporated in the interior of the body 4.

A worm shaft 14 is rotatably fitted in the body 4 between the dovetail slots 3 and the central shaft, and worm shaft 14 extends in a direction normal to the axis of each of the body 4 and the dovetail slots 3. The worm shaft 14 is fitted at both ends with clutches 15 and 15a which are rotatable coaxially via a key (not shown) therewith and are axially slidable therealong. Worm wheels 16 and 16a respectively mesh with the clutches 15 and 15a and are rotatably with the worm shaft 14, but are immovable therealong. Each of the clutches is formed at its outer periphery with a slot for engagement with a shifter 17. While the shifter 17 is moved in a direction parallel to the axis of the worm shaft 14, the clutches 15 and 15a are joined to either one of the worm wheels 16 and 16a to thereby transmit power from the worm wheels 16 and 16a to the worm shaft 14, or they are otherwise joined to none of the worm wheels 16 and 16a so as to be held in a stationary state.

A drive shaft 18 is axially slidable in parallel relation to the worm shaft 14, and is adapted to slide the shifter 17 in the axial direction. The drive shaft is formed with an axially extending elongated bore. Penetrating the elongated bore is a pin which is fixed to the drive shaft 18, and is connected to a forked connecting member 19. The connecting member 19 is in the form of a plate, and is received in a tapered slot 22 formed in a shift lever 21 with a cam 20 in such a way as a pin provided centrally on the slot is fitted in a through hole formed at the connecting member 19. This pin is fixed to the body 4, and acts as a support about which the shift lever is rotated. Due to this arrangement, the rotary motion of the shift lever 21 is transmitted to the drive shaft 18. When the shift lever 21 is rotated in either direction about the pin by a feed direction detecting lever 23 via a connecting lever 24 and a joint 25, the cam 20 is moved in association with the feed direction detecting lever 23 since the forked connecting member 19 is fitted in the tapered slot 22 of the shift lever 21. When the slope of the tapered slot 22 is aligned with the forked portion of the joint 19, a cam roller 28 is biased in either direction relative to the apex of the cam 20 by a compression spring 26 via a press lever 27 so as to permit sliding movement of the drive shaft 18. In this state, the clutches 15 and 15a become operatively associated with the worm wheels 16 and 16a and the worm shaft 14 is thus driven for rotation.

A longitudinally extending slot of semicircular section is formed centrally in the body 4 in parallel relation to the dovetail slots 3. Rotatably fitted in the central portion of the slot, without axially extending spaces, is an internally threaded worm wheel 29 which is, in turn, in mesh with the worm shaft 14. The tool holder 7 is provided with the dovetails 5 which are slidably fitted to the corresponding dovetail slots 3. Fitted centrally in the tool holder 7 is the feed screw 6 which extends in a direction parallel to the dovetails 5, and which is threadably engaged with the internally threaded worm wheel 29. It should be mentioned that the feed screw 6 is fitted in the tool holder 7 in such a way as they are in no case slidable in the axial direction, unless the feed screw 6 is manually rotated.

Formed centrally in the tool holder 7 is an elongated slot (not shown) intended not to inhibit sliding movement of the tool holder 7 when the internally threaded worm wheel 29 is rotated.

Figure 4:
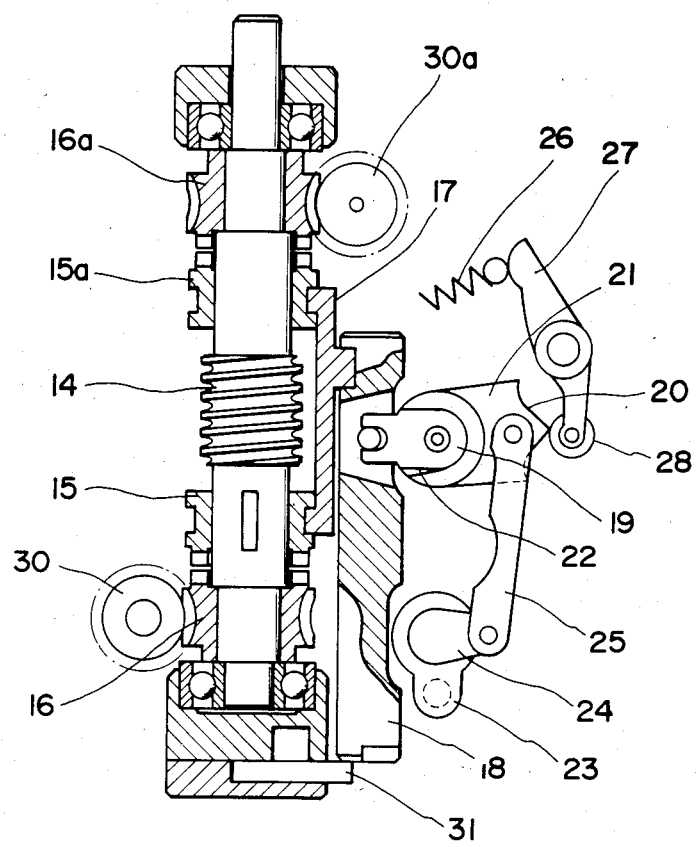
FIG. 4 is a view taken along the line A—A of FIG. 1.

As shown in FIG. 4, two worms 30 and 30a are arranged to mesh with the worm wheels 16 and 16a respectively, and being oppositely disposed relative to the longitudinal axis of the worm shaft 14 and the center line extending in a direction normal thereto. The worm 30a is in coaxial relation to the gear 8, and is in mesh with the stationary gear 9 provide at the inner periphery of the operating ring 2. During rotation of the body 4, the worm 30a is intended to constantly orbit around the inner periphery of the stationary gear 9. The other worm 30 is in coaxial relation to the feed gear 12. During rotation of the body 4, the worm 30 is intended to orbit along the inner periphery of the feed pins 11 projecting from the end surface of the operating ring 2. The worm 30 is rotated intermittently by each pin 11.

The main shaft normally rotates in a clockwise direction. Accordingly, the feed gear 12 and the gear 8 meshing with the stationary gear 9 are rotated in a counterclockwise direction. On the other hand, the worms 30 and 30a are both formed with right-hand threads and are oppositely arranged relative to the axis of the worm shaft 14 as set forth above. The worm wheels 16 and 16a are thus rotated in an opposite direction so as to shift the direction of movement of the tool holder 7.

A stop lever 31 is formed with a projection and acts as a ratched wheel with one tooth. The stop lever 31 is constantly rotatable clockwise under the loading force of a compression spring. Formed at one portion of the stop lever 31 is a semicircular notch 32 through which the drive shaft 18 passes. When the drive shaft 18 is situated below the surface of the body 4, the stop lever 31 is rotated under pressure of the spring to cover the top surface of the drive shaft 18. In this state, rapid returning and feeding operation is stopped. On the other hand, a pin is provided on one member projecting from the outer periphery of the operating ring 2, and its head portion of which projecting in a constant manner under the influence of the spring 26. The pin is situated in concyclic relation to the stop lever 31 during rotation of the body 4, and is adapted to constitute a pawl 33. When the main shaft is rotated two or three times at low speeds, the pawl 33 impinges against the tooth of the stop lever 31 and in turn, the stop lever 31 is rotated counterclockwise to thereby uncover the top surface of the drive shaft 18. Also, when the cam roller 28 is disengaged from the apex of the cam 20, the drive shaft 18 is moved upwardly by the action of the compression spring 26 via the lever 21 and the joint 19 and projects from the notch 32. As a result, the clutch 15 is joined to the worm wheel 16 by the shifter 17. Thus, feeding on the cutting tool is initiated.

A longitudinally extending slot of T-section is formed in the tool holder 7 as shown in the drawings. Stoppers 35 and 35a are fixedly mounted in given places of the slot. When the tool holder 7 is moved until the stopper 35a comes into contact with the feed direction detecting lever 23, the feed direction shift means acts to avoid non output conditions when the cutting tool support mechanism is not in motion. Thus, the mechanism can be rapidly returned.

Reference is next made to the operating ring 2. In a conventional mechanism for feeding feed pins, it is necessary for the operator to press the head of each of the pins required. In order to reduce the number of the pins, all of the pins need to be removed once and a required number of pins are again pressed.

This invention is intended to increase and decrease the speed of the feed operating ring 2 or to freely shift same in a neutral position by rotating the feed adjusting ring 37 to positions necessary to feed out the pins. Formed in the operating ring 2 are several stopped holes 36 into which the flanged pins 11 are inserted together with compression springs. Cams 37 are provided on the end surface of an adjusting ring 39, and are incorporated into slots and hubs (not shown) formed at the end surface of the operating ring 2. Formed at the inner periphery of the adjusting ring 39 are positioning slots 38, the number of which being equal to that of the stepped holes 36. A ball and a compression spring are adapted to bias the operating ring 2 so as to rotate the adjusting ring 39 relative thereto. Thus, the adjusting ring 39 is so positioned as to feed the feed pins with the aid of the concave-convex portion of the cams 37 or release the same.

With such a simple arrangement as mentioned above, the speed of automatic feeding of the cutting tool may simply and rapidly be changed. The illustrated embodiment of the invention shows means for feeding the feed pins for use in connection with the facing device. It will be understood that the invention may be applied to a positioning mechanism for use in connection with an index head.

Figure 6A:
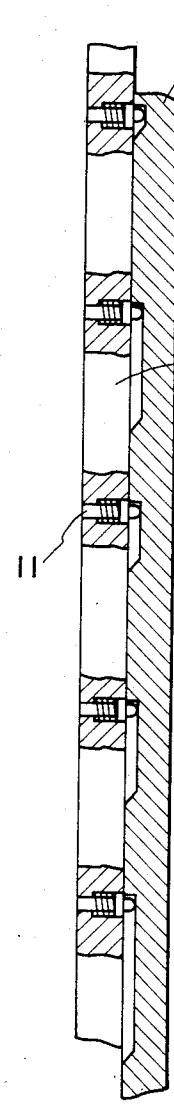
FIGS. 6(a), 6(b) and 6(c) are sectional views of the means shown in FIG. 5.
Figure 6B:
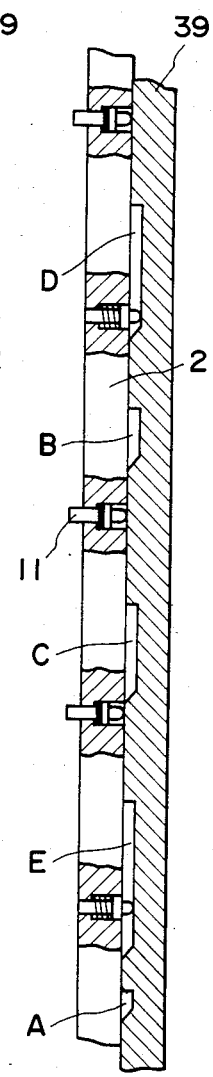
Figure 6C:
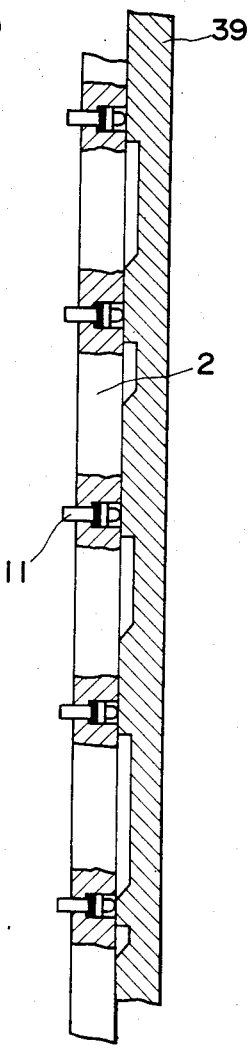
Figure 7:
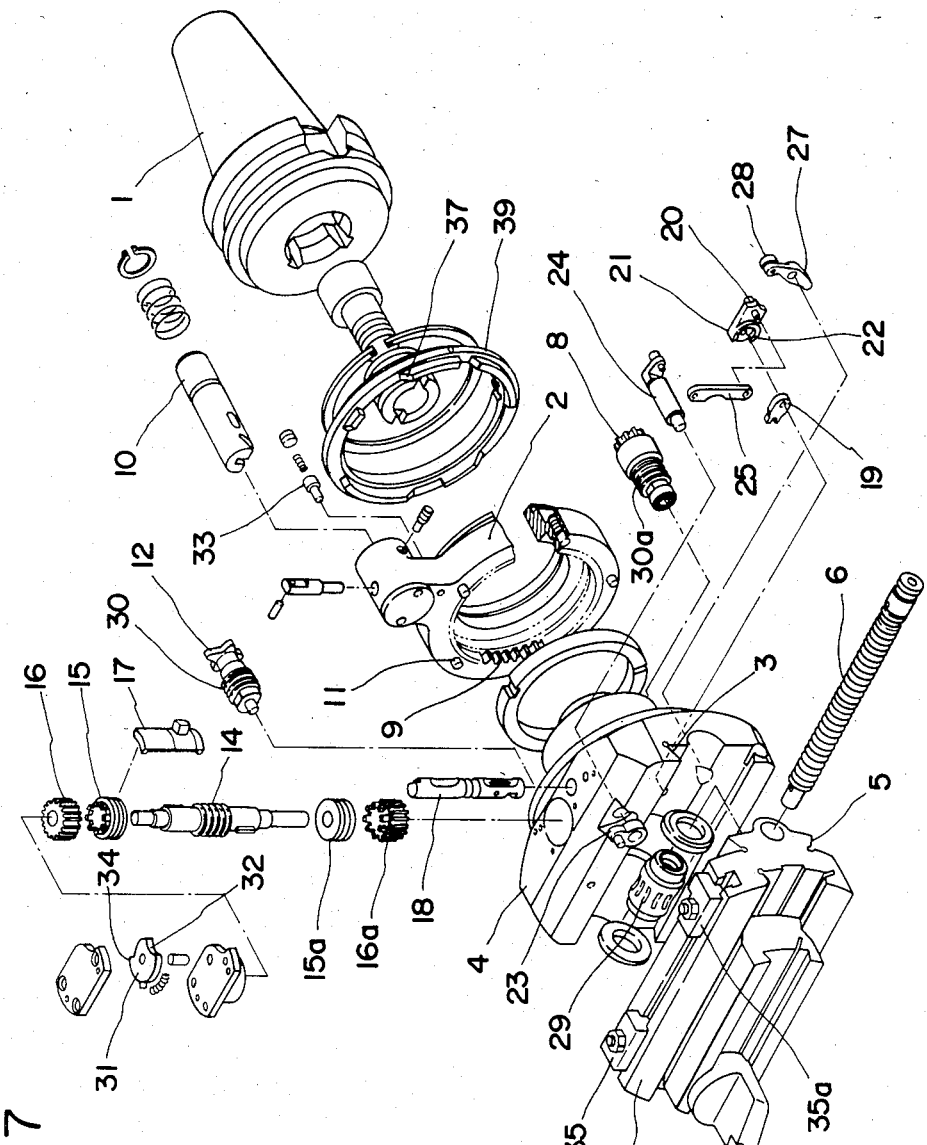
FIG. 7 is an exploded perspective view of the device shown in FIG. 1.

Reference is finally made to the concave and convex portions of the cams 37 in relation to the pins. FIG. 6 is a sectional view of the feed pins 11 of the operating ring 2 and the cams 37. The feed pins 11 are positioned in equally spaced-apart. In FIG. 6(a), all of the pins 11 are completely inserted into the respective concave portions of the cams 37. In FIG. 6(b), several of the pins 11 project from the end surface of the operating ring 2 under the influence of the convex portions of the cams 37 while the adjusting ring 39 is rotated. In FIG. 6(c), all of the pins 11 project from the end surface of the operating ring 2.

The number of the holes formed in the operating ring 2 corresponds to that of the feed pins 11 required. The holes are formed circumferentially equally spaced-apart. Provided on the adjusting ring 39 are concave-convex portions in equally spaced-apart. The angle at which the concave-convex portions are provided is obtained by adding one to the necessary number of the pins 11, multiplying the sum by the number of the concave-convex portions, and then dividing the product by the circumference. The angle of a concave portion B is twice that of the concave portion A. The angle of a concave portion C is three times that of the concave portion A. The angle of a concave portion D is four times that of the concaved portion A. The angle of a concaved portion is five times that of the concaved portion A. Such combination is not in order. The cams adapted to feed pins 11 are included in these concaved portions.

Figure 5:
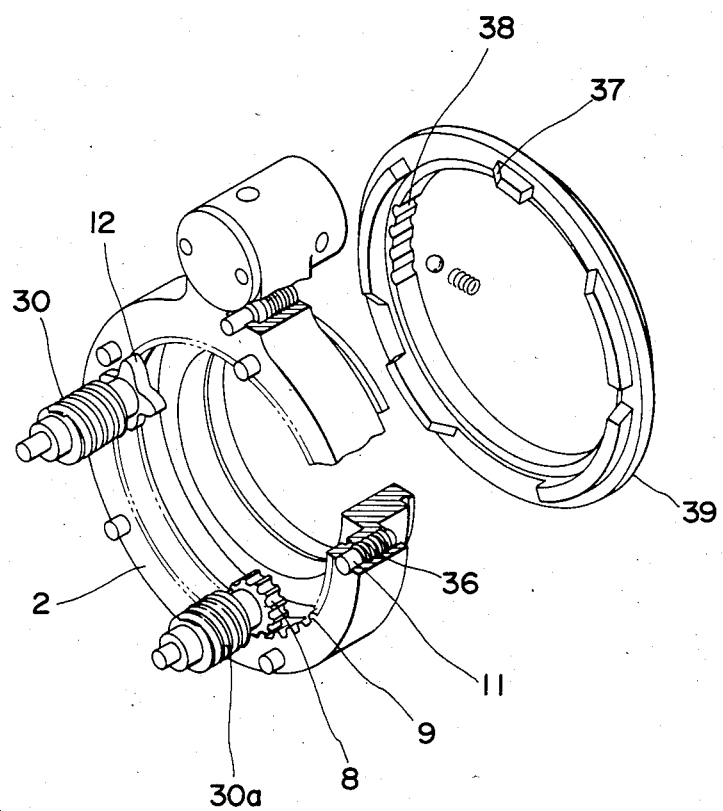
FIG. 5 is an exploded perspective view of means for feeding feed pins.

Each of the positioning slots 38 formed at the inner periphery of the adjusting ring 39 shown in FIG. 5 is identical in angle to the concaved portion A shown in FIG. 6, the number of which corresponding to that of the feed pins 11 required.

It is to be understood by those skilled in the art that the foregoing description is a preferred embodiment of the disclosed device, and that various changes and modifications may be made in the invention without departing from the spirit and scope thereof.

What is claimed is:

1. In a facing head operable with a shank mounted on a main shaft of a machine tool, comprising a body fixed in coaxial relation to the shank and having dovetail slots extending in a direction normal to the axis of the main shaft, a tool holder slidably fitted to the body through the dovetail slots, and an operating ring fitted between the shank and the body and fixed to said machine tool, said operating ring having an internal stationary gear and also having feed pins projecting from an end face of the operating ring, an automatic feed device for automatically moving said tool holder in a radial direction during rotation of the main shaft, said automatic feed device comprising a worm shaft disposed centrally of the body and extending in a direction normal to the axis of the main shaft and the dovetail slots, clutches and worm wheels rotatably fitted to both ends of the worm shaft respectively and arranged in diagonally opposite relation to the axis of the worm shaft, worm elements meshing with the corresponding worm wheels, a gear arranged in coaxial relation to one of the worm elements and meshing with said stationary gear provided at the inner periphery of the operating ring, a feed gear arranged in coaxial relation to the other worm element and operable to engage said feed pins projecting from the end surface of the operating ring, an internally threaded worm wheel fitted centrally to the body and meshing with the worm shaft, a feed screw fitted in the tool holder and arranged in parallel relation to the dovetail slots, said feed screw being threadably engaged with the internally threaded worm wheel, a shifter connected simultaneously to the two clutches and being free to slide in a direction parallel to the axis of the worm shaft, a shifter driving shaft engaged with the shifter, said shifter driving shaft being slidable and having an elongated slot therein, a shift lever constituting a cam and having a tapered slot, a forked connecting member pivotally connected to the shifter driving shaft via a pin and received in the tapered slot, a press lever biased by a compression spring and operable to press a cam roller against the cam, and a feed direction detecting lever arranged at the end surface of the body in parallel relation to the axis thereof and connected via a joint to the shift lever.

2. In a facing head as claimed in claim 1, further comprising a feed pin feeding means for extending and withdrawing said feed pins from said operating ring and including a slot at the end surface of said operating ring, stepped holes formed in said operating ring circumferentially in equally spaced relationship, said feed pins having a flange, a compression spring about each of said feed pins, said feed pins and their associated spring being disposed in said stepped holes, and a feed adjusting ring rotatably fitted in the slot formed at the end surface of the feed operating ring and having concaved portions and cams operable to engage said feed pins and to thereby extend individual feed pins from said operating ring depending on the adjusted position of said adjusting ring.

3. A facing head operable with a shank mounted on a main shaft of a machine tool, comprising a body fixed in coaxial relation to the shank and having dovetail slots extending in a direction normal to the axis of the main shaft, a tool holder slidably fitted to the body through the dovetail slots, and an operating ring fitted between the shank and the body and fixed to said machine tool, said operating ring having an internal stationary gear and also having feed pins projecting from an end face of the operating ring, an automatic feed device for automatically moving said tool holder in a radial direction during rotation of the main shaft, said automatic feed device comprising a worm shaft disposed centrally of the body and extending in a direction normal to the axis of the main shaft and the dovetail slots, clutches and worm wheels rotatably fitted to both ends of the worm shaft respectively, worm elements meshing with the corresponding worm wheels, a gear arranged in coaxial relation to one of the worm elements and meshing with said stationary gear provided at the inner periphery of the operating ring, a feed gear arranged in coaxial relation to the other worm element and operable to engage said feed pins projecting from the end surface of the operating ring, an internally threaded worm wheel fitted centrally to the body and meshing with the worm shaft, a feed screw fitted in the tool holder and arranged in parallel relation to the dovetail slots, said feed screw being threadably engaged with the internally threaded worm wheel, and a shifter connected simultaneously to the two clutches and being free to slide in a direction parallel to the axis of the worm shaft, said shifter having one operable position to engage one of said worm wheels with said worm shaft, another operable position to engage the other of said worm wheels with said worm shaft, and a further operable position where both of said worm wheels are disengaged from said worm shaft.

4. A facing head operable with a shank mounted on a main shaft of a machine tool, comprising a body fixed in coaxial relation to the shank and having dovetail slots extending in a direction normal to the axis of the main shaft, a tool holder slidably fitted to the body through the dovetail slots, and an operating ring fitted between the shank and the body and fixed to said machine tool, said operating ring having an internal stationary gear and also having feed pins projecting from an end face of the operating ring, an automatic feed device for automatically moving said tool holder in a radial direction during rotation of the main shaft, said automatic feed device comprising a worm shaft disposed centrally of the body and extending in a direction normal to the axis of the main shaft and the dovetail slots, clutches and worm wheels rotatably fitted to both ends of the worm shaft respectively, worm elements meshing with the corresponding worm wheels, a gear arranged in coaxial relation to one of the worm elements and meshing with said stationary gear provided at the inner periphery of the operating ring, a feed gear arranged in coaxial relation to the other worm element and operable to engage said feed pins projecting from the end surface of the operating ring, an internally threaded worm wheel fitted centrally to the body and meshing with the worm shaft, a feed screw fitted in the tool holder and arranged in parallel relation to the dovetail slots, said feed screw being threadably engaged with the internally threaded worm wheel, a shifter connected simultaneously to the two clutches and being free to slide in a direction parallel to the axis of the worm shaft to selectively engage and disengage said worm wheels with said worm shaft, and a feed pin feeding means for extending and withdrawing said feed pins from said operating ring, and including a slot at the end surface of said operating ring, stepped holes formed in said operating ring circumferentially in equally spaced relationship, said feed pins having a flange, a compression spring about each of said feed pins, said feed pins and their associated spring being disposed in said stepped holes, and a feed adjusting ring rotatably fitted in the slot formed at the end surface of the feed operating ring and having concaved portions and cams operable to engage said feed pins and to thereby extend and withdraw individual feed pins from said operating ring depending on the adjusted position of said adjusting ring.

5. A facing head as claimed in claim 4 wherein said concave portions and cams are disposed in a circle, said concave portions being separated by said cams, said cams being operable to engage said feed pins to extend the engaged feed pin from said end surface of said operating ring, said springs about said feed pins being operable to withdraw said pins when said concave portion is disposed opposite the respective feed pin.

6. A facing head as claimed in claim 5 wherein said adjusting ring has a plurality of adjusted positions with a different number of feeding pins being extended for each of said adjusted positions.

7. A facing head as claimed in claim 6 wherein said adjusting ring has one adjusted position in which none of the feed pins are extended, another adjusted position to extend one of said pins, a further adjusted position to extend a plurality of said feed pins which is less than all of the feed pins, and yet a further adjusted position to extend all of said feed pins.

8. A facing head as claimed in claim 7 wherein one of said cams engages one of said pins to extend said one feed pin for all of said adjusted positions except said one adjusted position.

9. A facing head as claimed in claim 7 wherein another of said cams engages another of said feed pins to extend said other feed pin for all of said adjusted positions except said one and said another adjusted position.

* * * * *